(12) United States Patent
Pfeilschifter et al.

(10) Patent No.: US 12,447,839 B2
(45) Date of Patent: Oct. 21, 2025

(54) HIGH-VOLTAGE CHARGING CIRCUIT IN A VEHICLE, AND ON-BOARD VEHICLE ELECTRICAL SYSTEM

(71) Applicant: Vitesco Technologies GMBH, Regensburg (DE)

(72) Inventors: Franz Pfeilschifter, Wenzenbach (DE); Martin Götzenberger, Ingolstadt (DE)

(73) Assignee: Vitesco Technologies GmbH, Regensburg (DE)

( * ) Notice: Subject to any disclaimer, the term of this patent is extended or adjusted under 35 U.S.C. 154(b) by 590 days.

(21) Appl. No.: 17/935,979

(22) Filed: Sep. 28, 2022

(65) Prior Publication Data

US 2023/0017971 A1   Jan. 19, 2023

Related U.S. Application Data

(63) Continuation of application No. PCT/EP2021/057677, filed on Mar. 25, 2021.

(30) Foreign Application Priority Data

Mar. 4, 2020   (DE) .......................... 102020204336.1

(51) Int. Cl.
*B60L 53/22* (2019.01)
*B60L 1/02* (2006.01)
(Continued)

(52) U.S. Cl.
CPC ................. *B60L 53/22* (2019.02); *B60L 1/02* (2013.01); *B60L 53/14* (2019.02); *H02J 7/0068* (2013.01);
(Continued)

(58) Field of Classification Search
CPC ..................................................... B60L 53/22
(Continued)

(56) References Cited

U.S. PATENT DOCUMENTS

2018/0041061 A1   2/2018   Mclaughlin et al.
2019/0288526 A1*  9/2019   Jaensch ................. H02J 7/0024
(Continued)

FOREIGN PATENT DOCUMENTS

DE   102009007737 A1   8/2010
DE   102012203612 A1   9/2013
(Continued)

OTHER PUBLICATIONS

International Search Report and Written Opinion dated Mar. 25, 2021 from corresponding International Patent Application No. PCT/EP2021/057677.

(Continued)

*Primary Examiner* — Jerry D Robbins

(57) ABSTRACT

A vehicle-based high-voltage charging circuit is provided with an AC voltage terminal, at least two galvanically isolating DC-DC converters designed as step-up converters and a rectifier via which the DC-DC converters are connected to the AC voltage terminal, and a changeover switch. The charging circuit has a first and a second DC voltage terminal selectably connected to the first DC-DC converter via the changeover switch. The charging circuit has a third DC voltage terminal connected to the second DC-DC converter, wherein the charging circuit also has a controller which is set up, in a first mode, to drive the DC-DC converters according to a first target output voltage which is at least 750 V and at most 1000 V, and, in a second mode, to drive the DC-DC converters according to a second target output voltage which is at most 480 V or at most 450 V.

16 Claims, 1 Drawing Sheet

(51) Int. Cl.
    *B60L 53/14* (2019.01)
    *H02J 7/00* (2006.01)
    *H02J 7/02* (2016.01)
    *H02M 7/217* (2006.01)
(52) U.S. Cl.
    CPC .............. *H02J 7/02* (2013.01); *H02M 7/217* (2013.01); *B60L 2210/14* (2013.01); *B60L 2210/30* (2013.01); *H02J 2207/20* (2020.01)
(58) Field of Classification Search
    USPC ........................................................ 320/109
    See application file for complete search history.

(56) References Cited

U.S. PATENT DOCUMENTS

| | | |
|---|---|---|
| 2020/0091830 A1 | 3/2020 | Maruyama |
| 2021/0265855 A1 | 8/2021 | Pfeilschifter et al. |
| 2021/0347271 A1 | 11/2021 | Pfeilschifter et al. |
| 2022/0041074 A1 | 2/2022 | Pfeilschifter et al. |
| 2023/0356607 A1* | 11/2023 | McAlwee ............... B60L 53/57 |
| 2023/0398889 A1* | 12/2023 | Maruyama ........ H02M 3/33584 |
| 2024/0128849 A1* | 4/2024 | Ammanamanchi ... H02M 3/158 |

FOREIGN PATENT DOCUMENTS

| | | |
|---|---|---|
| DE | 102018000491 A1 | 7/2018 |
| DE | 102018210579 A1 | 1/2020 |
| DE | 102018216233 A1 | 3/2020 |
| DE | 102018216236 A1 | 3/2020 |

OTHER PUBLICATIONS

German Office Action dated Jan. 29, 2021 for corresponding German Patent Application No. 10 2020 204 336.1.

* cited by examiner

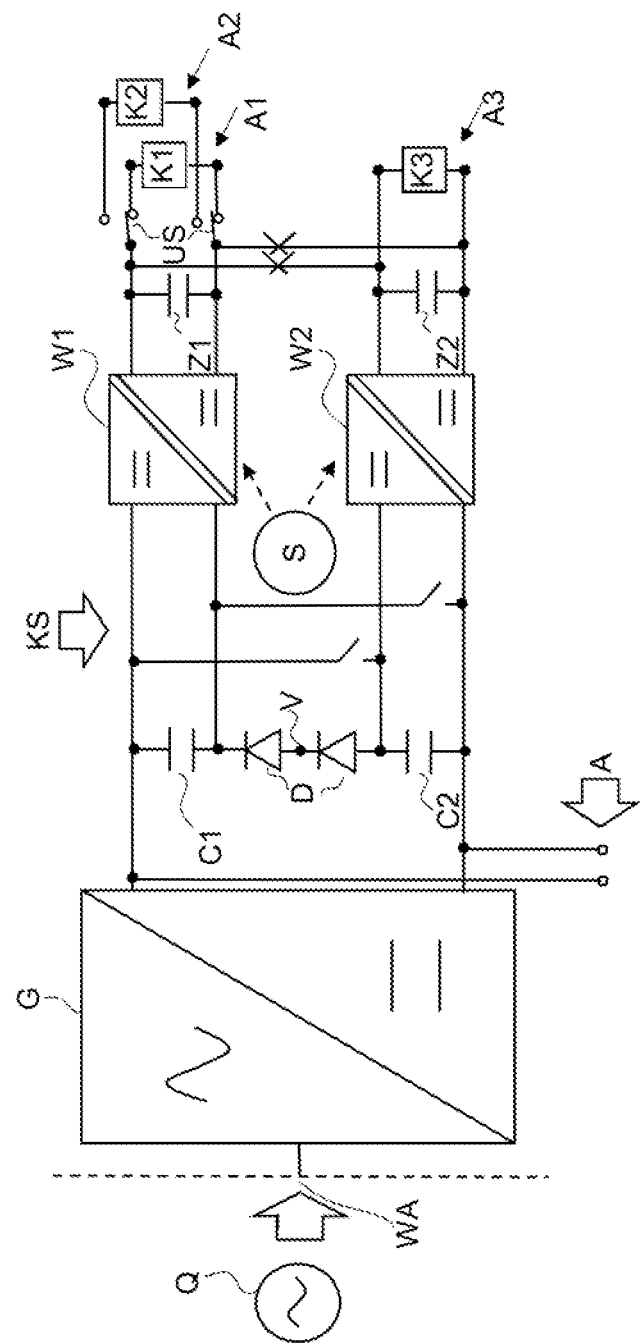

HIGH-VOLTAGE CHARGING CIRCUIT IN A VEHICLE, AND ON-BOARD VEHICLE ELECTRICAL SYSTEM

CROSS-REFERENCE TO RELATED APPLICATIONS

This application claims priority to PCT Application PCT/EP2021/057677, filed Mar. 25, 2021, which claims priority to German Patent Application No. DE 10 2020 204 336.1, filed Apr. 3, 2020. The disclosures of the above applications are incorporated herein by reference.

BACKGROUND OF THE INVENTION

Vehicles with an electric drive, that is to say so-called electric vehicles and hybrid vehicles, have a rechargeable battery for feeding the electric drive of the vehicle. There are also other electrical components such as electrical heating elements or electronics systems that have to be supplied with electrical energy. Furthermore, in the case of so-called plug-in vehicles, there is the possibility of charging the vehicle from the outside via at least one electrical terminal. In order to be able to do this as quickly as possible, there are attempts to use rechargeable batteries with a high rated voltage of more than 400 volts, for example at the level of 600 volts or, such as 800 volts or 1000 volts.

SUMMARY OF THE INVENTION

Other components are designed for voltages that deviate from this, for example for voltages of 400 volts, with low-voltage components, which are designed for rated voltages of, for example, 12 volts, also still existing. In order to be able to implement the functions mentioned above, taking into account the large number of different voltage levels mentioned within the same vehicle electrical system, numerous DC-DC converters and also other components for linking the vehicle electrical system sections with different rated voltages are used. It is an object of the invention to show a possibility using which the functions mentioned and different voltage levels in the vehicle electrical system are implemented in a manner conscious of costs and with a smaller number of components.

This object is achieved by the subjects of the disclosure. Further properties, features, and embodiments emerge from the description and FIG. 1.

It is proposed to design a vehicle-based high-voltage charging circuit including a rectifier to which two DC-DC converters are connected. Different components or electrical system branches that have different voltage levels are connected to one of these DC-DC converters via a changeover switch depending on the mode (or switching status of the changeover switch). Another DC voltage terminal is connected to the rectifier not via the DC-DC converter but directly in order to enable the possibility of connecting further components (with their own voltage level). Different components are therefore supplied with electrical energy by the changeover switch without the need for a further converter. The direct connection to the DC voltage side of the rectifier also enables the formation of a DC voltage level where, at the same time, the converters are not loaded by this type of voltage supply and voltages other than the converter voltages are also offered for supply.

The invention therefore proposes a vehicle-based high-voltage charging circuit which has an AC terminal, at least two DC-DC converters and a rectifier. The DC-DC converters are galvanically isolating and include a transformer by which the galvanic isolation is carried out. In an embodiment, the DC-DC converters are designed as step-up converters. In this case, the DC-DC converters have a first side which is connected to the rectifier (such as the DC voltage side thereof), and a second side which faces away from the first side or the rectifier. The DC-DC converters are designed as step-up converters in such a way that a voltage on the first side is transmitted from the DC-DC converters to the respective second side, with the voltage on the second side being greater than that on the first side. The DC-DC converters are connected to the AC voltage terminal via the rectifier. In this case, the first sides of the DC-DC converters are connected to the rectifier.

The charging circuit also has a changeover switch and a first and a second DC voltage terminal. These are connected to the changeover switch. The first and the second DC voltage terminal are selectably connected to the DC-DC converter via the changeover switch. The changeover switch thus selectably connects the first DC voltage terminal to the first DC-DC converter or the second DC voltage terminal to the first DC-DC converter. In different modes, different DC voltage terminals are connected (via the changeover switch) to the first DC-DC converter, with the DC-DC converter also delivering different transformation ratios or different voltages to the respective DC voltage terminal (which is connected to the first DC-DC converter via the changeover switch) in different modes. The DC voltage terminals are thus selectably connected to the DC-DC converter via the changeover switch, and this may be combined with different output voltages of the first DC-DC converter in order to be able to provide different rated voltages at the different DC voltage terminals. This is used to supply components or electrical system branches that have different rated voltages or operating voltages. As a result, components or electrical system branches of different rated voltages or operating voltages are supplied with different voltages, in which case the first DC-DC converter is used for different operating voltages or to supply different components or electrical system branches. Another mode ("isolating mode") is also conceivable, in which the changeover switch does not connect either of the two DC voltage terminals to the first DC-DC converter, for example for safety reasons, corresponding to an open switching position.

The charging circuit has a third DC voltage terminal. The third DC voltage terminal is connected to the second DC-DC converter. In this case, the connection is permanent, for example in order to supply an electrical system branch or a component that has to be supplied permanently, in an embodiment, for safety reasons. For example, a low-voltage electrical system branch is supplied by the third DC voltage terminal and the second DC-DC converter connected to it. In this case, the third DC voltage terminal would be connected to a low-voltage converter which is set up to generate a voltage for the low-voltage electrical system branch from the voltage generated by the rectifier, for example at a level of approximately 12 V (or also 24 V or 48 V).

The charging circuit in an embodiment also has a controller. The controller is set up, in a first mode, to drive the DC-DC converter (that is to say the first and the second DC-DC converter) according to a first target output voltage which is at least 750 V (or at least 650 V) and at most 1000 V (or at most 1200 V), for example approximately 800 volts. The controller is also set up, in a second mode, to drive the DC-DC converter according to a second target output voltage which is approximately half (+/−25% or +10%) thereof, for example at most 480 volts or at most 450 volts. A low-voltage converter connected to the third DC voltage terminal is set up to generate a low voltage, for example approximately 12 volts, 24 volts or 48 volts, both from the first-mentioned, higher voltage range and from the second-mentioned, lower voltage range.

The first target output voltage is at least 750 volts (or at least 650 V). The first target output voltage may also be at most 1000 volts or at most 1100 volts or 1200 V, for example to supply a rechargeable battery or a high-voltage electrical system branch, that is to say generally a component that requires a high voltage of at least 750 volts in at least one state, that is to say the operating voltage range thereof has a section which is at least 750 volts. The relevant component is designed to operate in at least one state with a minimum operating voltage of 750 volts (or 650 V). This is the case with a rechargeable battery with a rated voltage of 800 volts, for example in order to fully charge it and reach the maximum state of charge. In the first mode, the changeover switch connects the first DC-DC converter to the first DC voltage terminal.

In the second mode, the changeover switch has a different switching state than in the first mode. As a result, the lower voltage, which is at most 480 volts or at most 450 volts, is fed to the second DC voltage terminal via the changeover switch, with the result that a component or an electrical system branch is provided at the second DC voltage terminal, which is supplied with at most 480 volts or at most 450 volts (that is to say designed for a maximum operating voltage=480 volts or 450 volts), but which is not designed to operate at 650 volts or 750 volts or more. This is the case, for example, for electrical heating elements which have a rated voltage of around 400 volts, but which are also operated non-destructively at a voltage of 450 or 480 volts, that is to say components whose maximum permissible operating voltage is 10%, 15% or 20% above the rated operating voltage. In the case of heating elements, this is possible because, due to their thermal inertia, an output that is higher in the short term is acceptable. An electrically operated air conditioning compressor may also be used here. In the second mode, the changeover switch connects the second DC-DC converter to the first DC-DC converter.

The charging circuit also includes a configuration circuit. The DC-DC converters are connected to the rectifier via the configuration circuit. The configuration circuit is set up to connect the DC-DC converters in parallel (in a first configuration) or in series (in a second configuration) to one another and in this way also to the rectifier. The configuration circuit is thus set up, in a first configuration, to connect the sides of the DC-DC converters facing the rectifier (=their first sides) in parallel with one another and to connect the DC-DC converters to the rectifier in parallel. The configuration circuit is also set up, in a second configuration, to connect the sides of the DC-DC converters (=first sides) facing the rectifier in series with one another. This resulting series circuit is connected to the rectifier, in an embodiment the ends of the resulting series circuit are connected in parallel with the rectifier. The DC-DC converters are thus connected to the rectifier in this series configuration if the second configuration is provided by the configuration circuit. Provision may be made for the parallel configuration to be set (in an embodiment by the controller) when the DC voltage side of the rectifier outputs a voltage below a predetermined limit, and for the series configuration to be set when the rectifier outputs a DC voltage that is greater than this limit. In the former case, a comparatively low voltage, which is below a maximum input voltage of the rectifier, is generated, for example, by single-phase charging via the rectifier. In the case of three-phase charging, there is a higher voltage on the DC voltage side of the rectifier, with the result that a series configuration are then set, with the first side of the DC-DC converters and any link circuit capacitors connected to it then each only receiving half of the voltage output by the rectifier. This is then due to the halving of the voltage (due to the series connection) below the maximum input voltage of the rectifier. The maximum input voltage of the rectifiers refers to the respective first side, that is to say the side that is connected to the rectifier.

The configuration circuit may include two switches, each of which connects a potential of the first side of the converters to one another in order to provide a parallel connection (for both potentials). In addition, the configuration circuit may have another switch or a diode or a diode circuit by which the potentials of the first sides of the DC-DC converters are connected to one another in series, such as when the switches provided for parallel connection are open. A diode circuit may have two diodes connected in series, the connection point of which is connected to a neutral conductor terminal of the AC voltage terminal.

When switching over from a series to a parallel configuration, parasitic capacitances and/or link circuit capacitors are precharged to the voltage that results when the configuration has changed, such as before the configuration is set using the switches. The corresponding pre-charging or discharging significantly reduces a charge equalization ("inrush current") which results from the changed voltage due to the changed configuration. For this purpose, various options for pre-charging or discharging are conceivable. The controller is set up, when there is a change between the two configurations, to drive a low-voltage converter which is connected to the rectifier via one of the DC-DC converters (more specifically the second one) to recharge capacitances that are connected to the DC-DC converter or are present at the first or second side of the DC-DC converters. These may be capacitances (link circuit capacitors and/or parasitic capacitances) on the first side (or second side) of the DC-DC converters or on the DC voltage side of the rectifier. In an embodiment, these may be capacitances that are on the rectifier side or on the DC-DC converter side, as seen from the configuration circuit. This relates to a link circuit capacitance on the DC voltage side of the rectifier, that is to say a link circuit capacitance between the rectifier and the configuration circuit. A corresponding charge reversal is always carried out when the state of charge changes on the AC side, that is to say when a state transition is carried out between the following states: single-phase charging, multi-phase charging and no charging, and in the case of transitions between the states: single-phase charging or multi-phase charging.

As an alternative or in addition, the controller may be set up to drive or activate a charge transfer circuit between capacitors on both sides of the DC-DC converters for the transfer of charge. A corresponding charge transfer circuit may be passive and include a switch and a resistor, for example, or may be active in the sense of a (in an embodiment, bidirectional) converter for charge equalization between capacitors on both sides of the configuration circuit or between capacitors of different DC-DC converters. Furthermore, the controller may be set up to activate a discharge circuit of capacitors, this affecting capacitors that are connected to the DC-DC converters. In an embodiment, a charge transfer circuit as mentioned above is provided, which is present between capacitors on both sides of the DC-DC converters. It is also possible to provide a charge transfer circuit which is set up for passively or actively pre-charging or discharging a capacitor which is connected to the DC voltage side of the rectifier.

The DC-DC converters may be of the same design. In this case, the DC-DC converters are designed with the same rated power, and also with the same components which also have the same design. In an embodiment, the DC-DC converters have the same input voltage range and the same output voltage range, and transistors with the same transformation ratio. In addition, the DC-DC converters may have the same rated current or maximum current.

One embodiment makes provision for at least the DC-DC converter connected to the changeover switch, that is to say the first DC-DC converter, to be of bidirectional design. The controller is set up, in the first mode, to drive the DC-DC converter connected to the changeover switch to generate a voltage on the side of this DC-DC converter which is connected to the rectifier.

An auxiliary consumer terminal is provided on that side of the rectifier which is connected to the DC-DC converter, that is to say on the DC voltage side of the rectifier. As a result, the voltage is tapped off at the auxiliary consumer terminal, the voltage also being applied (completely or partially) to the first sides of the DC-DC converters via the configuration circuit. The controller may be set up to drive one of the DC-DC converters (i.e., the first one) to convert a voltage on the second side into a voltage on the first side, which is then fed to the auxiliary consumer terminal (directly or via the configuration circuit). For example, if a rechargeable battery is connected to a side of a DC-DC converter facing away from the rectifier, then this delivers energy to the auxiliary consumer terminal, that is to say to the DC voltage side of the rectifier, via the relevant DC-DC converter and, if necessary, via the changeover switch. This applies to the first DC-DC converter. A further aspect is that the rectifier may also be of bidirectional design and may be set up to generate a DC voltage, which is applied to the DC voltage side of the rectifier, into an AC voltage for feedback via the AC voltage terminal. In this case, electrical energy is fed in via the first DC voltage terminal, the second DC voltage terminal or the auxiliary consumer terminal; the controller is set up to control the relevant energy transmission.

In an embodiment, provision may be made for the first DC voltage terminal to be connected to a rechargeable battery, wherein the first DC-DC converter connected to it is set up to convert the voltage from the second side of the converter into a voltage on the first side (connected to the rectifier) of the converter in order to be able to feed at least one auxiliary consumer via the auxiliary consumer terminal. A low-voltage electrical system branch is connected via a low-voltage converter via the second DC-DC converter. The controller is designed to drive the low-voltage electrical system branch to transfer electrical energy from the low-voltage electrical system branch to the auxiliary consumer terminal, the first side of the second DC-DC converter or the DC voltage side of the rectifier in order to recharge existing capacitances (link circuit capacitors and/or parasitic capacitances) to the new voltage to be expected for an upcoming change in configuration, especially before the configuration circuit changes its state (controlled by the controller). A component or an electrical system branch may be connected to the second DC voltage terminal, this component not being a rechargeable battery and the connected electrical system branch not having a rechargeable battery, in an embodiment an electrical heating element or an electrically operated air conditioning compressor.

The second sides of the DC-DC converter, that is to say the sides facing away from the rectifier, are connected to one another in parallel permanently or via a switching element. In this case, one potential of a DC-DC converter is connected in a switchable manner to the other potential; the switching element is thus designed with two poles. The changeover switch may be combined with a switching element of this type. Furthermore, it is possible that the changeover switch is not provided between the second side of the first DC-DC converter and the two DC voltage terminals, but both between the second sides of the DC-DC converters on the one hand and between the DC voltage terminals and the two second sides of the DC-DC converters. Instead of or in combination with the changeover switch, which connects the DC voltage terminals selectably to the second side of the first DC-DC converter, it is possible to provide a changeover switch device which connects the connections for parallel connection of the second sides of the DC-DC converters selectably to the first and second DC voltage terminals. Provision may be made for this changeover switch device also to have the function or a switching element that makes it possible to open or establish the parallel connection between the second sides of the DC-DC converters in a targeted manner. Therefore, in addition to the changeover switch or instead of the changeover switch, it is possible to provide a changeover switch device which connects the side of the first DC-DC converter which faces away from the rectifier in a switchable manner to the side of the second DC-DC converter which faces away from the rectifier, and which alternatively or additionally connects this side of the first DC-DC converter facing away from the rectifier selectably to the first or the second DC voltage terminal. When the parallel connection of the second sides of the DC-DC converters is open, the DC-DC converters are driven (simultaneously) by the controller with different operating modes. This applies to operating modes with different output voltages or converter powers or duty cycles for clocking within the DC-DC converters. The changeover switch device is also designed with two poles. The side of the first or second DC-DC converter that faces away from the rectifier is also referred to as the second side of the relevant DC-DC converter. The opposite side of the DC-DC converter, that is to say the side facing the rectifier, is referred to as the first side of the relevant DC-DC converter.

The changeover switch and/or the changeover switch device may include electromechanical switching elements as the switching element, but in an embodiment semiconductor switching elements are used to form the changeover switch or the changeover switch device. It is also conceivable that both electromechanical switching elements and semiconductor switching elements are used, this being the case for the changeover switch device, in which case the parallel connection between the second sides of the DC-DC converters is then switched by electromechanical switching elements, and the selectable connection between the (first) DC-DC converter and the DC voltage terminals is formed in a switchable manner by semiconductor switching elements. The semiconductor switching elements are in an embodiment transistors, such as MOSFETs or IGBTs. The transistors may be used individually as switching elements of the changeover switch or changeover switch device, or are provided, for example, as a pair of transistors connected back-to-back, such as when transistors with body diodes are used. In the first mode, the changeover switch or the changeover switch device connects the first DC voltage terminal to the first DC-DC converter and, in the second mode, connects the second DC voltage terminal to the first DC-DC converter. The controller is set up to drive the changeover switch or the changeover switch device accordingly.

A vehicle electrical system including a charging circuit as illustrated here is also described. In this case, a rechargeable battery of the vehicle electrical system is connected to the first DC voltage terminal. The rechargeable battery is in an embodiment a traction rechargeable battery which is designed as a high-voltage component. The rechargeable battery may be a rechargeable lithium battery. The rechargeable battery may have a standard operating voltage (rated voltage) of at least 750 volts or at least 950 volts, and in an embodiment is at a level of approximately 800 volts. A consumer of the vehicle electrical system is provided at the second DC voltage terminal. This consumer has a different standard operating voltage (rated voltage) than the rechargeable battery, namely essentially half (+25% or +/−10%) thereof. The standard operating voltage (rated voltage) of the consumer which is connected to the second DC voltage terminal is essentially 400 or 420 volts, for example at least 350 volts and in an embodiment is no more than 500 or 600 volts. Conventional 400-volt components are used here as consumers. In addition, the maximum operating voltage (maximum voltage specified by design) of the consumer (also only temporarily) is more than 400 volts, for example approximately 420, 440 or in an embodiment 450 volts. This is the case with electrical heating elements, since their thermal inertia allows a higher voltage or higher power for a short time without causing damage to the consumer. Electrical air-conditioning compressors or the like may also be used as consumers that are connected to the second DC voltage terminal.

The rechargeable battery connected to the first DC voltage terminal is generally a first component, in an embodiment a first consumer. The rechargeable battery represents a consumer during the charging process, for example. The consumer connected to the second DC voltage terminal may generally be a second component or a second consumer. This consumer may also be referred to as a 400-volt consumer or 400-volt component. The first DC voltage terminal is connected (via switches) to the auxiliary consumer terminal. A rechargeable battery is connected (via switches) to the auxiliary consumer terminal and (via further switches) to the first DC voltage terminal. The rated voltage of the rechargeable battery essentially corresponds to the voltage at the first DC voltage terminal in the first mode; in the first mode, the voltage at the DC voltage terminal is adjusted to a target charging voltage of the rechargeable battery via the first DC-DC converter. If the terminal voltage of the rechargeable battery is above a limit, it may be connected to the auxiliary consumer terminal, and in an embodiment to the first DC voltage terminal. If the terminal voltage of the rechargeable battery is not above the limit, it may be connected to the first DC voltage terminal, and not to the auxiliary consumer terminal. Switches which are controlled accordingly by the controller are provided for the appropriate changeover switching. The controller is designed to control these connections.

The component connected to the third DC voltage terminal may be referred to as the third component. In this case, an electrical system branch (as the fourth component) is connected to the third DC voltage terminal. The electrical system branch or the third component is also part of the vehicle electrical system. The standard operating voltage of the electrical system branch or the third component is at least 750 volts or at least 950 volts, in an embodiment approximately twice the standard operating voltage of the second consumer. The standard operating voltage of the component (electrical system branch) connected to the third DC voltage terminal essentially corresponds to the standard operating voltage of the first component (the rechargeable battery at the first DC voltage terminal). However, different operating voltages with a deviation of at most +/−10% or at most +/−25% are possible. The standard operating voltage refers to the voltage on which the design of the relevant component is based and may also be referred to as the rated voltage. The component at the second DC voltage terminal may have a rated voltage of 400 volts or 420 volts, but is in an embodiment designed for a maximum operating voltage that is higher, for example by at least 10% or at least 20%, with the result that the component is designed for (temporary) operation at a higher voltage of approximately 440 volts or 450 volts.

The consumer connected to the second DC voltage terminal, that is to say the second component, is an electrical heating element. In an embodiment, this is an electrical heating element of an exhaust-gas aftertreatment device (such as an electrically heated catalytic converter), a cooling circuit of a power electronics system, such as a drive, a heating element of a cooling circuit of an interior heater or a window heater. The electrical system branch connected to the third DC voltage terminal, that is to say the third component, may have a low-voltage voltage converter with downstream low-voltage components. These are designed for a rated voltage of 12 volts (or else 24 or 48 volts). As a result, the electrical system branch connected to the third DC voltage terminal may be a 12-volt vehicle electrical system with the known 12-volt electronic components such as the entertainment system and on-board computer, or else safety-relevant electronics systems such as anti-lock braking systems, driver assistance systems, lighting and the like.

One aspect is that, by use of the charging circuit or by use of the vehicle electrical system, the first and the second component, that is to say for example a rechargeable battery (as a consumer in the charging mode of the rechargeable battery) at the first DC voltage terminal and another consumer, such as a heating element, at the second DC voltage terminal is operated simultaneously using the changeover switches. In this case, the first and the second DC voltage terminal are alternately connected to the DC-DC converter and supplied by the latter via the changeover switch, with the respective duration and repetition rate of connecting the corresponding DC voltage terminal defining the effective power for the connected component. In this case, the changeover switch is thus operated according to a target charging power for the rechargeable battery and according to a target power for the second consumer. In an embodiment, the changeover switch is switched over repeatedly, and in an embodiment periodically, with the duty cycle defining the power that is output by the respective DC voltage terminals. In this case, the controller is set up to set a weighting of the target charging power for the rechargeable battery and a weighting of the target power for the second consumer according to a priority specification. This indicates whether an error between the target charging power and the actual charging power of the rechargeable battery is to be minimized or whether the difference between the target power and an actual power of the second consumer is to be minimized. However, it is also possible to specify targets that affect both components and thus both powers, such as a specified maximum deviation between the target and actual charging power and/or a maximum deviation between the target and actual power. In addition, the priority specification may be controlled in terms of time, for example with different points in time at which on the one hand the rechargeable battery must be precharged and on the other hand the second consumer must have provided a certain amount of energy (amount of heat). For example, if a departure date is selected, the rechargeable battery may already be fully charged an hour before this date, whereas the closer the departure time gets, the priority is shifted towards the second consumer, that is to say toward electrical heating, and most of the power is delivered to the second consumer at the expense of the charging capacity. The controller may also be set up to set a duty cycle, according to which the changeover switch is switched over, as a function of at least one of the weightings. The changeover switch defines what proportion of the total power is delivered to the first DC voltage terminal and what proportion (complementary thereto) the power transmitted via the second DC voltage terminal has. As mentioned, the duty cycle may be variable, for example in order to allow priorities that differ over time, although operating states of the first and second components may also have an impact on the priority specification. For example, in the case of a state of charge below a minimum limit, the priority is shifted from the second consumer, that is to say from the heating element, to charging the rechargeable battery.

BRIEF DESCRIPTION OF THE DRAWINGS

The invention will be explained in detail below with reference to an exemplary embodiment in conjunction with the drawing, in which:

FIG. 1 is used to provide an explanation of the vehicle electrical system described here and the vehicle-based charging circuit.

DETAILED DESCRIPTION OF THE PREFERRED EMBODIMENT

The following description of the preferred embodiment(s) is merely exemplary in nature and is in no way intended to limit the invention, its application, or uses.

FIG. 1 shows a charging circuit with connected components K1, K2, K3 which is able to be connected to an external AC voltage source via an AC voltage terminal. The AC voltage terminal may be designed as a standardized charging socket, for example. The charging circuit connected thereto has a rectifier whose AC voltage side is connected to the AC voltage terminal. The DC voltage side is connected to two DC-DC converters W1, W2 via a configuration circuit KS. The rectifier is connected to the two DC-DC converters W1, W2 via the configuration circuit KS.

The configuration circuit has two switches which, in the closed state, connect the two first sides of the DC-DC converters W1, W2, that is to say the sides facing the rectifier G, in parallel with one another. Furthermore, a diode circuit made up of two series diodes D is part of the configuration circuit, the diodes making it possible to connect the first sides of the DC-DC converters W1, W2 to one another in series when the switches are open. A first capacitor C1 is connected to the first side of the first DC-DC converter W1. A second capacitor C2 is connected to the first side of the second DC-DC converter W2. These capacitors are used to smooth the voltage on the first sides of the DC-DC converters W1, W2.

The DC-DC converters W1, W2 also have second sides which face away from the rectifier G. Further capacitors Z1, Z2 are connected to these second sides in order to smooth the voltage on the second sides of the DC-DC converters. These capacitors are also referred to as link circuit capacitors. The same also applies to the capacitors C1, C2. A changeover switch US is connected to the second side of the first DC-DC converter W1, via which changeover switch a first DC voltage terminal A1 or a second DC voltage terminal A2 is selectably connected. A third DC voltage terminal A3 is connected to the second side of the second DC-DC converter W2.

An auxiliary consumer terminal is connected directly to the DC voltage side of the rectifier.

A first component K1 is connected to the first DC voltage terminal A1. The first component K1 may be a rechargeable battery, for example a high-voltage rechargeable battery, such as a rechargeable battery with a rated voltage of approximately 800 volts or 850 volts. A second component K2 is connected to the second terminal A2. This is a 400-volt component that is designed for a maximum operating voltage of 450 volts (also only temporarily). This may be a heating element or else an electric air conditioning compressor. The component K1 generally has a higher rated voltage than the component K2, such as a rated voltage which is approximately twice as great, or even corresponds to only 180% or 190% of the rated voltage of the second component K2.

The changeover switch is designed with two poles and provides a selectable connection of both potentials of the first DC voltage terminal or both potentials of the second DC voltage terminal A2. The changeover switch may also have a third switching state or mode in which neither the first DC voltage terminal nor the second DC voltage terminal is connected to the first DC-DC converter W1.

A third component K3 is connected to the third DC voltage terminal. This is a low-voltage voltage converter, for example a converter on whose second side (facing away from the second DC-DC converter) a rated voltage of 12 volts (or else 24 volts or 48 volts) is provided. The low-voltage DC-DC converter has a first side which faces the second DC-DC converter W2 and which is provided for a rated voltage of at least 800 volts or 950 volts. It is possible to provide a low-voltage electrical system branch which has a low-voltage DC-DC converter of this type that is connected directly to the third DC voltage terminal A3. The component K3 may thus be a place holder for a low-voltage electrical system branch. While in this low-voltage electrical system branch there are components for which a low-voltage converter is provided in order to provide a suitable operating voltage according to the rated voltage of the components, the component K1 is also designed for (temporary) operating voltages above the relevant rated voltage. A rechargeable battery, such as an 800-volt rechargeable battery, is connected to the first DC voltage terminal. A component which is designed for an operating voltage of approximately 400 V and which is designed for a maximum operating voltage of approximately 420 V or 450 V, for example a heating element, is connected to the second DC voltage terminal. A rechargeable battery would possibly be damaged when operated with a voltage above the rated voltage, with the result that no rechargeable battery is connected to the second DC voltage terminal.

The rectifier is designed to output voltage on the side of the changeover switch at the level of 800 V (as the upper voltage range) and also at the level of 450 V (as the lower voltage range).

An electric drive is connected to the auxiliary consumer terminal (via an isolating switch device), such as an inverter of an electric drive and possibly an electric machine connected thereto, 800-volt components such as heating elements or air conditioning compressors designed for this purpose and/or also a high-voltage rechargeable battery with a rated voltage of 800 volts. This may be the same rechargeable battery that is also connected (via isolating switches) to the first DC voltage terminal. In addition, a direct DC voltage charging terminal (possibly via the isolating switch device) is connected to the auxiliary consumer terminal (possibly via the isolating switch device). This is connected to the rechargeable battery (via its own isolating switch) in order to allow direct charging. Since the first DC voltage terminal is also connected to the rechargeable battery (also in a switchable manner, such as in a switchable manner via the changeover switch), the rechargeable battery is charged via the first DC-DC converter W1, the changeover switch US and the first DC voltage terminal (for example for pre-charging if the state of charge is below a limit), and may be equally charged via the direct DC voltage charging terminal, such as when the state of charge is not below the limit.

As mentioned, the changeover switch is provided between the first and second DC voltage terminal A1, A2 on the one hand and the second side of the first DC-DC converter W1. Alternatively or in combination with this, a changeover switch device may be provided at the point marked with a cross, that is to say in the parallel connection of the second sides of the DC-DC converters W1, W2.

The changeover switch may have two or three switching positions, namely a first state in which the first DC voltage terminal A1 is connected to the converter W1, a second state in which the second DC voltage terminal A2 is connected to the converter, and a third state in which neither of the two DC voltage terminals mentioned is connected to the first converter. The changeover switch device also has two states in which the first or the second DC voltage terminal is connected to the second side of the DC-DC converters, may have a further state in which neither of the two named DC voltage terminals is connected to the DC-DC converters W1, W2, and also has a fourth state in which the second side of the first DC-DC converter W1 is disconnected from the second side of the second DC-DC converter W2. Otherwise, the second sides of the two DC-DC converters W1, W2 are connected to one another in parallel (in two-pole fashion).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle-based high-voltage charging circuit comprising:
    an AC voltage terminal;
    at least two galvanically isolating DC-DC converters;
    a rectifier via which the at least two galvanically isolating DC-DC converters are connected to the AC voltage terminal;
    a changeover switch;
    a first DC voltage terminal;
    a second DC voltage terminal, the first DC voltage terminal and the second DC voltage terminal selectively connected to a first of the at least two galvanically isolating DC-DC converters via the changeover switch;
    a third DC voltage terminal connected to the second of the at least two galvanically isolating DC-DC converters; and
    a controller having a first mode and a second mode;
    wherein during the first mode, the controller drives the at least two galvanically isolating DC-DC converters according to a first target output voltage which is at least 750 V and at most 1000 V, and during the second mode, the controller drives the at least two galvanically isolating DC-DC converters according to a second target output voltage which is at most 480 V or at most 450 V.

2. The vehicle-based charging circuit of claim 1, further comprising:
    a configuration circuit having a first configuration and a second configuration, the at least two galvanically isolating DC-DC converters being connected to the rectifier via the configuration circuit;
    wherein in the first configuration, the sides of the at least two galvanically isolating DC-DC converters facing the rectifier are connected in parallel with one another and are connected to the rectifier, and in the second configuration, the sides of the at least two galvanically isolating DC-DC converters facing the rectifier are connected in series with one another and are connected to the rectifier.

3. The vehicle-based charging circuit of claim 2, further comprising:
    a low-voltage converter, which is connected to the rectifier via one of the at least two galvanically isolating DC-DC converters; and
    a plurality of capacitances, each of which is connected to at least one of the at least two galvanically isolating DC-DC converters;
    wherein the controller is set up, when there is a change between the first configuration and the second configuration, to drive the low-voltage converter to charge capacitances.

4. The vehicle-based charging circuit of claim 2, further comprising:
    a charge transfer circuit;
    wherein the controller is set up to drive the charge transfer circuit between capacitors on both sides of the configuration circuit, or between capacitors on both sides of the at least two galvanically isolating DC-DC converters, or between capacitors of different DC-DC converters, to transfer charge.

5. The vehicle-based charging circuit of claim 2, wherein the controller is set up to activate a discharge circuit of capacitors which is connected to the at least two galvanically isolating DC-DC converters.

6. The vehicle-based charging circuit of claim 1, wherein the at least two galvanically isolating DC-DC converters are of the same design.

7. The vehicle-based charging circuit of claim 1, the first of the at least two galvanically isolating DC-DC converters connected to the changeover switch further comprising a bidirectional design, wherein the controller is set up to drive the first of the at least two galvanically isolating DC-DC converters in the second mode to generate a voltage on the side of drive the first of the at least two galvanically isolating DC-DC converters which is connected to the rectifier, and an auxiliary consumer terminal is connected to the side of the rectifier which is connected to the at least two galvanically isolating DC-DC converters.

8. The vehicle-based charging circuit of claim 1, wherein, in the second mode, the changeover switch is set up to connect the first DC voltage terminal and the second DC voltage terminal alternately to the first of the at least two galvanically isolating DC-DC converters repeatedly, periodically, or according to a predetermined variable duty cycle.

9. The vehicle-based charging circuit of claim 1, further comprising a changeover switch device which connects the side of the first of the at least two galvanically isolating DC-DC converters facing away from the rectifier in a switchable manner to the side of the second of the at least two galvanically isolating DC-DC converters facing away from the rectifier.

10. The vehicle-based charging circuit of claim 9, wherein the changeover switch device connects the side of the first of the at least two galvanically isolating DC-DC converters facing away from the rectifier to the first DC voltage terminal or the second DC voltage terminal in a selectable manner.

11. The vehicle-based charging circuit of claim 1, each of the at least two galvanically isolating DC-DC converters further comprising step-up converters.

12. A vehicle electrical system comprising:
   a vehicle-based charging circuit, further comprising:
      an AC voltage terminal;
      at least two galvanically isolating DC-DC converters;
      a rectifier via which the at least two galvanically isolating DC-DC converters are connected to the AC voltage terminal;
      a changeover switch;
      a first DC voltage terminal;
      a second DC voltage terminal, the first DC voltage terminal and the second DC voltage terminal selectively connected to a first of the at least two galvanically isolating DC-DC converters via the changeover switch;
      a third DC voltage terminal connected to the second of the at least two galvanically isolating DC-DC converters;
      a controller having a first mode and a second mode;
      wherein during the first mode, the controller drives the at least two galvanically isolating DC-DC converters according to a first target output voltage which is at least 750 V and at most 1000 V, and during the second mode, the controller drives the at least two galvanically isolating DC-DC converters according to a second target output voltage which is at most 480 V or at most 450 V;
   a rechargeable battery connected to the first DC voltage terminal;
   a consumer with a standard operating voltage of essentially 400 V or 420 V connected to the second DC voltage terminal; and
   an electrical system branch with a standard operating voltage of at least 750 V or at least 950 V connected to the third DC voltage terminal.

13. The vehicle electrical system of claim 12, the consumer connected to the second DC voltage terminal further comprising one selected from the group consisting of an electrical heating element of an exhaust-gas aftertreatment device, a cooling circuit of a power electronics system, and an interior heater or a window heater.

14. The vehicle electrical system of claim 13, the electrical system branch connected to the third DC voltage terminal further comprising a low-voltage voltage converter with downstream low-voltage components which are connected to the third DC voltage terminal via the low-voltage voltage converter.

15. The vehicle electrical system of claim 12, wherein the controller is set up to drive the changeover switch according to a target charging power for the rechargeable battery and according to a target power for the second consumer.

16. The vehicle electrical system of claim 12, wherein the controller is set up to set a weighting of the target charging power for the rechargeable battery and a weighting of the target power for the second consumer according to a priority specification and to set a duty cycle, according to which the changeover switch is switched over, depending on at least one of the weightings.

* * * * *